(12) United States Patent
Ferre

(10) Patent No.: US 7,170,193 B2
(45) Date of Patent: Jan. 30, 2007

(54) EMERGENCY SITUATION POWER MANAGEMENT SYSTEM APPLIED TO AN AUTOMOTIVE VEHICLE

(75) Inventor: Antoni Ferre, Valls (ES)

(73) Assignee: Lear Corporation, Southfield, MI (US)

( * ) Notice: Subject to any disclaimer, the term of this patent is extended or adjusted under 35 U.S.C. 154(b) by 384 days.

(21) Appl. No.: 10/711,505

(22) Filed: Sep. 22, 2004

(65) Prior Publication Data
US 2006/0061215 A1    Mar. 23, 2006

(51) Int. Cl.
*B60L 1/00* (2006.01)
(52) U.S. Cl. ............................. 307/10.1; 307/9.1

(58) Field of Classification Search ............... 307/9.1, 307/10.1
See application file for complete search history.

(56) References Cited

U.S. PATENT DOCUMENTS 6,591,176 B1 *  7/2003  Perry et al. ............... 701/45

\* cited by examiner

*Primary Examiner*—Robert L. Deberadinis
(74) *Attorney, Agent, or Firm*—Bruce E. Harang

(57) ABSTRACT

A emergency power management system utilizing at least two power sources and electronic systems to monitor for emergency situations and respond to said emergency situations.

13 Claims, 2 Drawing Sheets

EMERGENCY SITUATION POWER MANAGEMENT SYSTEM APPLIED TO AN AUTOMOTIVE VEHICLE

FIELD OF THE ART

The present invention generally relates to a power management system applied to an automotive vehicle, and more particularly to an emergency situation power management system.

PRIOR STATE OF THE ART

For the purpose of providing a better response to the occupants of an automotive vehicle in the event of an accident, different safety devices have recently been incorporated in vehicles which perform actions in response to emergency situations, such as an accident, to facilitate the evacuation of the occupants from the vehicle and quickly aiding said occupants. A problem occurs when the power source feeding said devices fails, either due to the accident itself or to other causes. The following patents were conceived in an attempt to solve said problems:

U.S. Pat. No. 6,591,176 proposes an accident notification system having a main battery and a spare battery, each of them with a respective voltage. A telematic control unit monitors the main battery voltage and receives an emergency notification signal from a control module. When said module sends a certain emergency signal to the control unit and when the main battery voltage has dropped to being below a predetermined value, the spare battery is used to make the telematic unit work.

Besides actuating the telematic unit, the patent does not contemplate the possibility of performing another type of actions when an emergency situation is detected. Nor does it provide monitoring of the spare battery, which is not very realistic given that it could also undergo a voltage drop, or even be seriously damaged due to an accident.

German patent DE-A-19,849,674 proposes a device for unlocking an automotive vehicle door in an emergency situation using a spare battery for that purpose in response to a signal from a voltage monitoring circuit when it detects a failure of the main battery of the vehicle.

Even though in said patent the response due to an emergency situation is different from that of the previously mentioned background, neither in the previous one nor in this case is the spare battery monitored, therefore not contemplating that said spare battery may fail.

EXPLANATION OF THE INVENTION

It is interesting to provide an alternative to the state of the art, which provides a solution taking into account more factors other than those taken into account by the background discussed, both for actions to be performed when an emergency situation occurs and, especially, when taking into account that not only can the main battery fail, since this is not very realistic, and therefore providing greater safety when, if an emergency situation does occur, such as an accident, carrying out a series of alarm indicating actions, for which the system assures itself of what electrical power source is in conditions to be used in order to perform said actions and proceed to carry them out with it.

The present invention relates to an emergency situation power management situation applied to an automotive vehicle, comprising the combination of:

at least two electrical power sources, first detection means for detecting at least the voltage of said electrical power sources, which are at least two in number, second detection means for detecting variations in a series of parameters indicative of at least one emergency situation to which said vehicle is subjected, an electronic system associated to said first and second detection means and to control means applied to generate at least one action to perform when at least one of said emergency situations detected by said second detection means occurs, said action being carried out by means of using one of said power sources capable of providing a voltage above a determined threshold, which is chosen by the electronic system as a result of the information received from said first detection means.

Said electrical power sources are generally arranged such that they are spaced out in different parts of said vehicle so that in the event of an accident, it is difficult for both of them to be affected by the blow, and therefore one of them being able to be used for carrying out at least a series of basic actions in response to said accident, mainly focused on facilitating the evacuation of the occupants from the vehicle and/or notifying an emergency center so that they can come to the aid of said occupants.

BRIEF DESCRIPTION OF THE DRAWINGS

Other features of the invention will become more clear from the following description of an embodiment example illustrated in the attached drawings and which should be taken as an illustrative and non-limiting example. In the drawings.

DETAILED DESCRIPTION OF THE INVENTION

Figure 1:
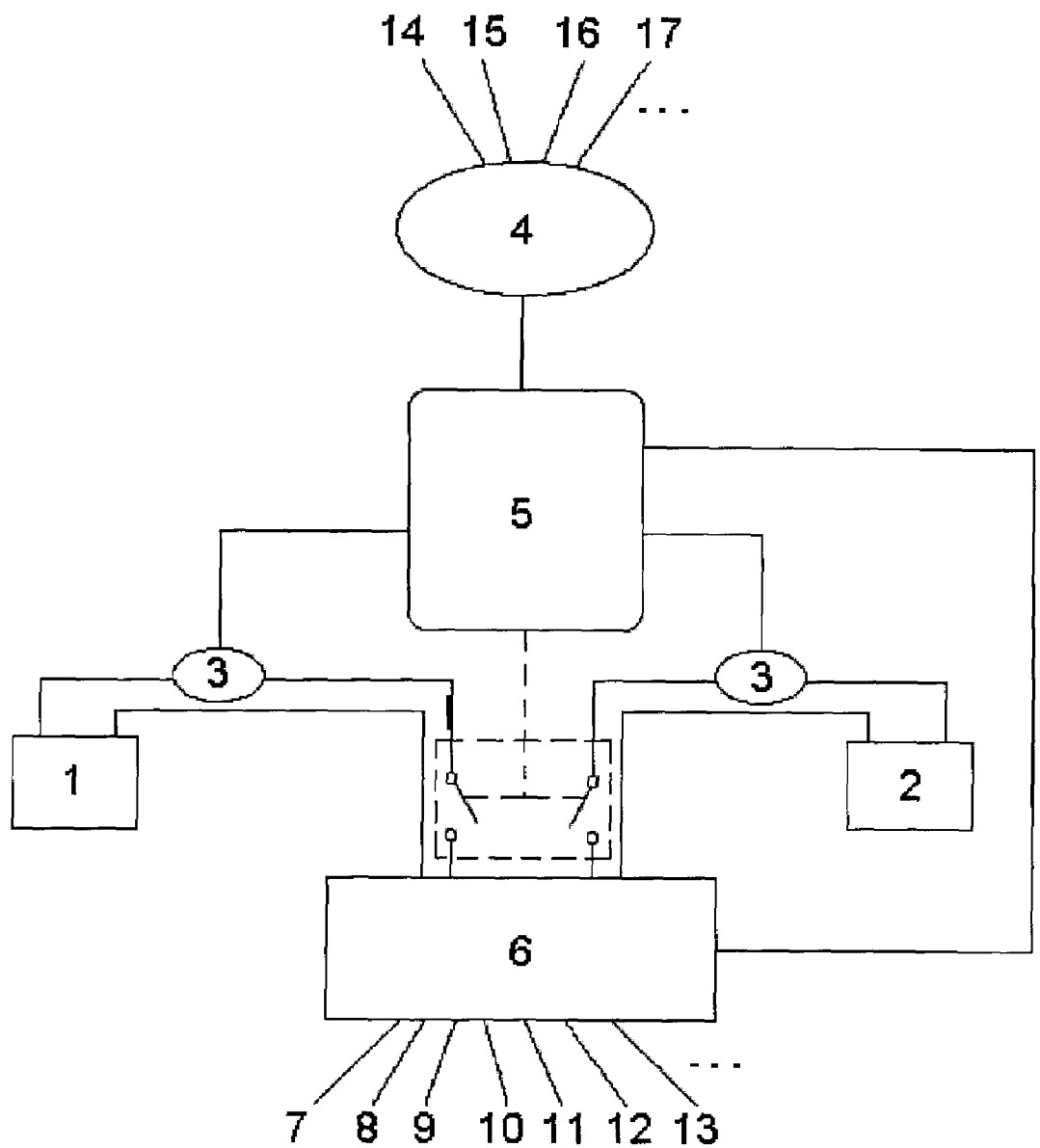
FIG. 1 shows a block diagram in which the main elements forming the system proposed by the present invention are represented.

As shown in FIG. 1, the emergency situation power management system applied to an automotive vehicle proposed by the present invention comprises the combination of:

two electrical power sources 1, 2 (although there can be more than two in number for other embodiment examples), first detection means 3 for detecting at least the voltage of said electrical power sources 1, 2 comprising at least a voltage sensor for each electrical power source 1, 2, second detection means 4 for detecting variations in a series of parameters indicative of an emergency situation or emergency situations to which said vehicle is subjected, an electronic system 5 associated to said first detection means 3 and second detection means 4 and to control means 6 applied to generate a series of actions to perform when one of said emergency situations detected by said second detection means 4 occurs, said action being carried out by means of using one of said power sources 1, 2 capable of providing a voltage above a determined threshold, which is chosen by the electronic system 5 as a result of the information received from said first detection means 3.

In FIG. 1, two electrical power sources 1, 2 are shown which are connected to said control means 6 through two pairs of lines, a switch I controlled by the electronic system 5 being arranged in one of the lines of each pair of lines in order to connect the power source 1, 2 chosen by said system with the control means 6 so that the latter also connect the power source with the device responsible for performing the action to be carried out.

Including said switches I and the arrangement of said lines is only one way of illustrating how the electronic system 5 applies the choice of one of the electrical power sources 1, 2 to practice and connects it with the devices responsible for performing the actions to be carried out due to an emergency situation, in this case through the control means 6.

Another possible way of carrying out said connection is achieved by connecting the lines directly to said devices with switches I such as those shown in FIG. 1, or with other suitable switching means, and therefore feeding the devices directly, however said switching means not being actuated until they receive an actuation command from the control means 6 after the latter has received a prior command from the electronic system 5, although other ways of connecting and actuating such devices, which may occur to a person skilled in the art, are possible.

For one preferred embodiment example, the system comprises only two electrical power sources 1, 2 of a different voltage.

Said electrical power sources 1, 2 are, preferably, batteries feeding different components or modules of said vehicle, although for another embodiment example one of said electrical power sources 1, 2 is a battery and the other one is an ultracap.

Figure 2:
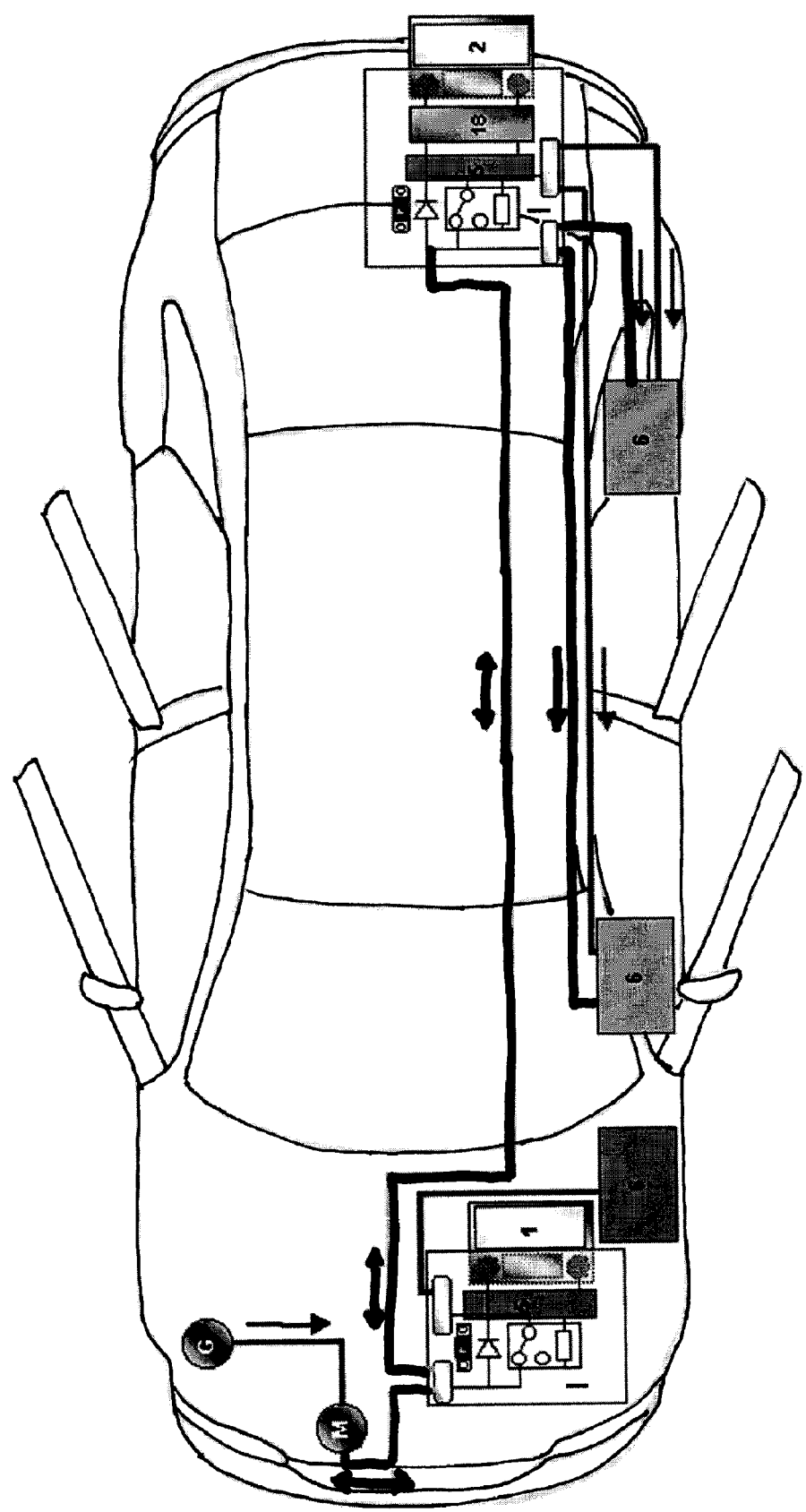
FIG. 2 shows an automotive vehicle incorporating the proposed system for an embodiment example.

For the embodiment example shown in FIG. 2, the system comprises a DC-DC boost, buck or buck-boost converter 1 8 connecting the two power sources 1, 2 of a different voltage and allows for the power flow between them.

As can also be seen in FIG. 2, the electrical power sources 1, 2 are arranged such that they are spaced out in different parts of said vehicle for the purpose of preventing, or making it more difficult, that both sources are damaged in the event of a possible accident. Another series of measures can also be taken to protect the electrical power sources, such as arranging them inside boxes protecting against blows, humidity, etc.

In FIG. 2 it can also be seen how the electronic system 5 is divided into two parts, each of them associated to an electrical power source 1, 2, and how there are three modules belonging to the control means 6 and applied to generate said actions to perform when an emergency situation occurs. Although they are not directly shown, in the embodiment example illustrated in FIG. 2, both the first detection means 3 and the second detection means 4 form part of some of the modules or elements shown in the figure, preferably part of the electronic system 5, to which they are associated. It can be seen in the figure how the electrical power sources 1, 2 are connected to the engine M of the vehicle shown, which in turn is connected to a respective generator G. As in the embodiment example schematically shown in FIG. 1, two switches I (in this case relays) can also be seen in the example illustrated in FIG. 2, which switches, controlled by the electronic system 5, are responsible for connecting the electrical power sources 1, 2 with the control means 6 and/or with said engine M of the vehicle.

In FIG. 1 a series of actions to perform when one of said emergency situations occurs is indicated. Said actions shown in the figure are to be taken only by way of example, given that any other action which a person skilled in the art would consider suitable could be possible. The preferred actions indicated in FIG. 1 are: unlocking the locks of the doors 7 of said vehicle, locally emitting acoustic and/or audible alarms 8, sending an alarm message or call 9 to a remote site, unbuckling the seat belts 10 of the vehicle, opening the windows 11 of the vehicle, actuating the airbags 12 of the vehicle and disconnecting a series of devices 13 susceptible to catching fire.

A preferred manner of performing said sending of an alarm message or call 9 to a remote site is that of using for it a radiofrequency transmitter included in the system, which could make use of communication infrastructures with emergency frequency bands established for this type of situations or, for example, mobile telephony networks, although any other suitable wireless system could be included in the system.

In reference to possible emergency situations due to which the proposed system acts to finally carry out any of the above-indicated actions, said situations can be quite varied. Those shown in FIG. 1 are to serve by way of example, and they are: a traffic accident 14, a failure of the electrical system 15 of the vehicle, a failure of the mechanical system 16 of the vehicle and the actuation of an emergency push button 17 included in the system.

Due to the variety of possible emergency situations discussed, said second detection means 4 can also comprise quite a varied group of detector devices in terms of number and type. The following devices are to serve by way of preferred example: an accelerometer and/or an inclinometer for detecting, for example, a traffic accident, a temperature sensor for detecting a possible overheating of any of the vital parts of the vehicle, a voltage sensor and/or an intensity sensor for detecting failures in the electrical system of the vehicle.

When one of the emergency situations in which the system has its application occurs, when the electronic system 5 has to choose the electrical power source 1, 2 in the best conditions, it could so happen that all of them had been damaged due to said emergency action, or that both of them, for other reasons, were rather discharged. This is why the proposed system comprises at least a DC-DC boost converter, the input of which is connected to said electrical power sources 1, 2 and the output of which is connected to several devices responsible for carrying out the actions to be performed when an emergency situation is detected, for the purpose of actuating them with a voltage from one of said electrical power sources 1, 2 that is lower than that needed for actuating said devices, one of said damaged or partially discharged electrical power sources 1, 2 therefore being able to be used even in the cases discussed, and making maximum use of the charge which they still conserve to perform the largest possible number of actions.

The electronic system has stored a list of priorities in terms of the actions to perform in response to emergency situations, above all thinking of the case discussed in the previous paragraph, in which the charge of the electrical power sources 1, 2 is rather low and must be used as best as possible to at least allow the occupants to evacuate the vehicle.

A preferred example of such a list of priorities, therein including the actions mentioned above and indicated in FIG. 1, is the following:

1) Actuating the airbags 12 of the vehicle.
2) Unbuckling the seat belts 10 of the vehicle.
3) Unlocking the locks on the doors 7 of the vehicle.

4) Disconnecting a series of devices 13 susceptible to catching fire.
5) Opening the windows 11 of the vehicle.
6) Sending an alarm message or call 9 to a remote site.
7) Locally emitting acoustic and/or audible alarms 8.

A person skilled in the art could introduce changes and modification in the described embodiment example without exceeding the scope of the invention as it is defined in the attached claims.

What is claimed is:

1. An emergency situation power management system applied to an automotive vehicle, comprising the combination of:
    at least two electrical power sources (1, 2),
    first detection means (3) for detecting at least the voltage of said electrical power sources (1, 2), which are at least two in number,
    second detection means (4) for detecting variations in a series of parameters indicative of at least one emergency situation to which said vehicle is subjected,
    an electronic system (5) associated to said first detection means (3) and second detection means (4) and to control means (6) applied to generate at least one action to perform when at least one of said emergency situations detected by said second detection means (4) occurs, said action being carried out by means of using one of said power sources (1, 2) capable of providing a voltage above a determined threshold, which is chosen by the electronic system (5) as a result of the information received from said first detection means (3).

2. A system according to claim 1, characterized in that it comprises only two electrical power sources (1, 2) of a different voltage.

3. A system according to claim 1, characterized in that said electrical power sources (1, 2) are batteries feeding different components or modules of said vehicle.

4. A system according to claim 2, characterized in that it comprises a boost, buck or buck-boost DC-DC converter (18) connecting the only two power sources (1, 2) of a different voltage and allows for the power flow between them.

5. A system according to claim 1, characterized in that at least one of said electrical power sources (1, 2) is a battery.

6. A system according to claim 1, characterized in that at least one of said electrical power sources (1, 2) is an ultracap.

7. A system according to claim 1, characterized in that said electrical power sources (1, 2) are arranged such that they are spaced out in different parts of said vehicle.

8. A system according to claim 1, characterized in that said action to perform, which is at least one, when at least one of said emergency situations occurs is one selected from the group comprising: unlocking the locks of the doors (7) of said vehicle, locally emitting acoustic and/or audible alarms (8), sending an alarm message or call (9) to a remote site, unbuckling the seat belts (10) of the vehicle, opening the windows (11) of the vehicle, actuating the airbags (12) of the vehicle and disconnecting a series of devices (13) susceptible to catching fire.

9. A system according to claim 8, characterized in that it comprises a radiofrequency transmitter for performing said sending of an alarm message or call (9) to a remote site.

10. A system according to claim 1, characterized in that said emergency situation, which is at least one, is one selected from the group comprising: a traffic accident (14), a failure in the electrical system (15) of the vehicle, a failure of the mechanical system (16) of the vehicle and the actuation of an emergency push button (17) included in the system.

11. A system according to claim 1, characterized in that it comprises at least a DC-DC boost converter, the input of which is connected to said electrical power sources (1, 2) and the output of which is connected to several devices responsible for carrying out the actions to be performed when an emergency situation is detected for the purpose of actuating them with a voltage from one of said electrical power sources (1, 2) lower than that needed for actuating said devices.

12. A system according to claim 1, characterized in that said second detection means (4) comprise at least an accelerometer and/or at least an inclinometer and/or at least a temperature sensor and/or at least a voltage sensor and/or at least an intensity sensor.

13. A system according to claim 1, characterized in that the electronic system comprises a memory having stored a list of priorities in terms of the actions to perform in response to said emergency situations.

* * * * *